L. H. Davis,
Lifting Jack,
N° 8,919. Patented May 4, 1852.
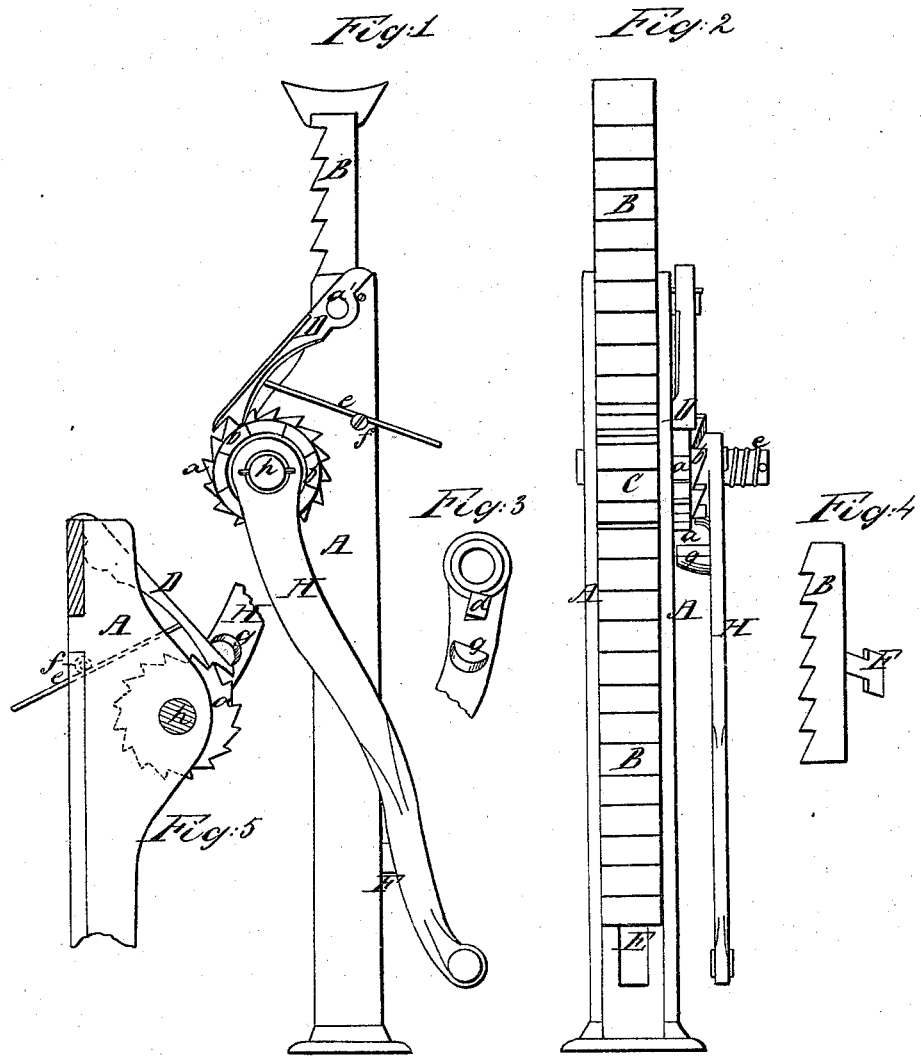

UNITED STATES PATENT OFFICE.

LEVIS H. DAVIS, OF KENNETT SQUARE, PENNSYLVANIA, ASSIGNOR TO I. A. DUGDALE.

LEVER-JACK.

Specification of Letters Patent No. 8,919, dated May 4, 1852.

*To all whom it may concern:*

Be it known that I, LEVIS H. DAVIS, of Kennett Square, in Chester county and State of Pennsylvania, have made certain new and useful Improvements in the Lever-Jack; and I do hereby declare the following to be a clear, full, and exact description of the same, reference being had to the accompanying drawings, which make a part of this specification, Figure 1 being a side elevation of the jack; Fig. 2, a front view; Fig. 3, a section of the lever detached; Fig. 4, a lower section of the rack-bar with crosshead, and Fig. 5 parts of the jack.

In Fig. 1, A is a frame which may be of cast iron and of one piece being joined both at top and bottom, but open in front sufficiently to receive the sliding rack bar B, and having a narrower opening or slot up and down the back (shown at E Fig. 2). At the top, this slot is widened sufficiently to insert the cross head F, (see also F, Fig. 4) which holds the rack B and frame together.

A shaft or axis (h) passes through the frame A, having upon it and within the frame a pinion (C, in Fig. 2) which works in the rack bar B to raise or lower the same. Upon the same shaft and outside the frame is secured a ratchet wheel of cast iron (a) which has also upon its disk ratchets (b, b.) Upon the same shaft also is lever H compressed to the disk of the ratchet wheel (a) by means of a spiral spring (c) which enables the lip (d, see Figs. 2 and 3) on the side of the lever to play freely in the meshes of the ratchets on the disk of the wheel.

D, is a dog secured near the top of the frame by a pin (a'). This dog working in the ratchet wheel (a) holds it at the end of every downward motion of the lever. Affixed to the dog is a spring (e) to throw it in and out of gear. When elevating the rack bar this spring is shifted to the upper side of the knob (f) and to the lower side, when lowering it.

Upon the inner side of the lever is a projecting cleat (shown as g, in Figs. 2 and 3) the use of which is to press the dog into a notch in the ratchet which is done by raising the lever (see Fig. 5) even when the spring (e) is below the knob (f) used to lower a weight gradually.

In Fig. 2 A, A, are the sides of the frame, B, B, the rack bar. C is the pinion D, the dog, H the lever, (d) the lip upon the lever, (g) is the projecting cleat, (c) the spiral spring. E is the slot or opening up and down the back of the frame. (a) is the ratchet wheel and (b) ratchets upon its disk all as before described.

In Fig. 3, are shown the lip (d) and cleat (g).

In Fig. 4, B, is the lower section of the rack bar and F, the cross head.

Fig. 5, is a side elevation, with parts removed, to show the action of the cleat (g) upon the dog D.

The whole arrangement of my improved jack is economical in its construction making it a simple and durable instrument, but if broken, a new rack bar is easily and securely inserted in an old frame and so of almost every other part.

What I claim as my invention and desire to secure by Letters Patent, is—

The combination of the lever H the lip (d) and the cleat (g) constructed as herein set forth, with the dog D, and the spring (e) so as to act together in the manner and for the purposes herein stated.

LEVIS H. DAVIS.

Witnesses:
JAMES MILES,
DAN BROWN.